US011907696B2

(12) United States Patent
Livne et al.

(10) Patent No.: US 11,907,696 B2
(45) Date of Patent: Feb. 20, 2024

(54) METHODS AND APPARATUS FOR SAFE AND SMART DISTRIBUTION OF SOFTWARE PATCHES

(71) Applicant: Ivanti, Inc., South Jordan, UT (US)

(72) Inventors: Eran Livne, Sandy, UT (US); Sébastien Baron, Aiffres (FR)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 17/937,566

(22) Filed: Oct. 3, 2022

(65) Prior Publication Data

US 2023/0022477 A1 Jan. 26, 2023

Related U.S. Application Data

(63) Continuation of application No. 16/542,501, filed on Aug. 16, 2019, now Pat. No. 11,461,086.

(60) Provisional application No. 62/719,155, filed on Aug. 17, 2018.

(51) Int. Cl.
| G06F 8/65 | (2018.01) |
| G06F 8/61 | (2018.01) |
| G06F 8/41 | (2018.01) |
| G06F 18/24 | (2023.01) |

(52) U.S. Cl.
CPC .............. *G06F 8/62* (2013.01); *G06F 8/433* (2013.01); *G06F 8/65* (2013.01); *G06F 18/24* (2023.01)

(58) Field of Classification Search
CPC ..... G06F 8/60; G06F 8/65; G06F 8/71; G06F 11/0709; G06F 11/3672
See application file for complete search history.

(56) References Cited

U.S. PATENT DOCUMENTS

| 8,365,164 | B1 * | 1/2013 | Morgenstern | G06F 8/61 717/175 |
| 2015/0186125 | A1 * | 7/2015 | Avery | G06F 9/44578 717/174 |

* cited by examiner

*Primary Examiner* — Duy Khuong T Nguyen

(57) ABSTRACT

Systems, devices, and methods are disclosed to send a signal to deploy a software patch at a compute device, to identify, based on a dependency map, a set of system components on the compute device that are likely to be impacted by the software patch, to monitor a set of parameters for a set of applications on the compute device that interact with a set of system components, to compare values for the set of parameters to one or more predefined criteria and to determine a compatibility classification for the software patch. Systems, devices, and methods are disclosed to update the dependency map based on the compatibility classification to define an updated dependency map, and based on the updated dependency map send a signal to deploy the software patch at a set of compute devices.

16 Claims, 7 Drawing Sheets

METHODS AND APPARATUS FOR SAFE AND SMART DISTRIBUTION OF SOFTWARE PATCHES

This application is a continuation of U.S. patent application Ser. No. 16/542,501, filed Aug. 16, 2019, entitled "Methods and Apparatus for Safe and Smart Distribution of Software Patches," which claims priority and the benefit of U.S. Provisional Application No. 62/719,155, filed Aug. 17, 2018, entitled "Methods and Apparatus for Safe and Smart Distribution of Software Patches." The disclosures of these applications are hereby incorporated by reference in their entireties.

BACKGROUND

The embodiments described herein relate to methods and apparatus for smart management and distribution of software patches to compute devices connected within a smart patching system.

Some known software applications installed in compute devices can be maintained and/or updated, which can include periodic deployment or distribution of supplemental information referred to as "software patches". The deployment and installation of software patches can sometimes alter the runtime functionality of existing software applications and/or other associated system components in compute devices. For example, the installation of software patches to application A can affect the functionality of a software application B. These collateral effects can be unpredictable, difficult and/or time-consuming to resolve, and often debilitating for the functioning of an organization using the compute devices.

Some known approaches to distributing software patches include deploying potential software patches in a select few test compute devices and assessing the effects of the new software patches on the test devices. Based on the assessment of the performance of patches in the test devices, the same software patches can be distributed to a relatively wider network of compute devices in a gradual manner. Such an approach, however, does not account for the fact that other compute devices in the wider network may be different from the test compute devices and may face problems that are not encountered in the test compute devices. Furthermore, the problems faced in the compute devices in the wider network may be unpredictably different or completely unrelated to problems faced and resolved in the test compute devices.

Thus, a need exists for improved apparatuses and methods for a safe, predictable approach to the management and distribution of software patches.

SUMMARY

A method includes receiving, from each compute device from a set of compute devices, data associated with (1) a set of software applications installed on that compute device and (2) interactions between the set of software applications installed on that compute device and a set of system components of that compute device. The method includes identifying, based on the data, dependencies between the set of software applications installed on each compute device from the set of compute devices and the set of system components of each compute device from the set of compute devices. The method includes defining a set of dependency maps based on the dependencies. The method further includes receiving information related to potential deployment of a software patch; and predicting a group of system components likely to be altered by the software patch. The method includes predicting, based on the set of dependency maps and the group of system components likely to be altered by the software patch, a set of software applications likely to be affected by the software patch. The method further includes identifying, based on the set of software applications likely to be affected by the software patch, a subset of compute devices as test compute devices for the software patch. The method further includes sending a signal to deploy the software patch at each compute device from the subset of compute devices identified as test compute devices.

In some embodiments, a non-transitory processor-readable medium stores code representing instructions to be executed by a processor. The instructions can include code to cause the processor to receive, from a compute device, data associated with (1) a set of software applications installed on the compute device and (2) interactions between the set of software applications installed on the compute device and a set of system components of the compute device. The code can cause the processor to identify dependencies between the set of software applications and the set of system components, based on the data, and update at least one dependency map associated with the compute device. The code can further cause the processor to receive information related to potential deployment of a software patch at the compute device, and predict, based on the information, a group of system components likely incompatible with the software patch. The instructions can further include code to cause the processor to send a signal to deploy the software patch at the compute device in response to the dependency map indicating that the set of software applications are unlikely to interact with the group of system components.

In some embodiments, an apparatus includes a memory and a processor. The processor is configured to send a signal to deploy a software patch at a compute device. The processor is configured to identify, based on a dependency map, a set of system components on the compute device that are likely to be impacted by the software patch. The processor is further configured to monitor a set of parameters for a set of applications on the compute device and that interact with at least one system component from the set of system components. The processor is further configured to compare values for the set of parameters to one or more predefined criteria to determine a compatibility classification for the software patch. The processor can be further configured to update the dependency map based on the compatibility classification to define an updated dependency map, and based on the updated dependency map, send a signal to deploy the software patch at a set of compute devices.

In some embodiments, an apparatus includes a memory and a processor. The processor is configured to receive, from an agent monitoring each compute device from a first set of compute devices, information related to installed software applications and system components in the first set of compute devices. The processor is configured to build dependency maps between the installed software applications and system components in the first set of compute devices. The processor is configured to receive information related to a first set of software patches that are deployed on the first set of compute devices and the system components in the first set of compute devices that are impacted by each software patch from the first set of software patches. The processor is configured to build dependency maps relating the first set of software patches and system components on the first set of compute devices. The processor is further configured to receive information related to a second set of software patches to be deployed on the first set of compute devices and provide a set of predicted effects on the installed software applications (or software environment) on the first set of compute devices predicted to occur in response to the potential deployment of the second set of software patches, based on the dependency maps generated between software patches and system components on the first set of compute devices, and the dependency maps generated between the installed software applications and system components on the first set of compute devices. The predictions can be used to select ideal candidate compute devices for safe software patch deployment and to preemptively resolve potential issues that may arise from patch deployment in non-tested compute devices. The processor is further configured to receive information related to installed software applications and system components on a second set of compute devices, and based on the dependency maps generated between software patches and system components on the first set of compute devices, and/or the dependency maps generated between the installed software applications and system components on the first set of compute devices, provide a set of predicted effects on the installed software applications on the second set of compute devices predicted to occur in response to the potential deployment of the set of the untested software patches.

DETAILED DESCRIPTION

Figure 1:
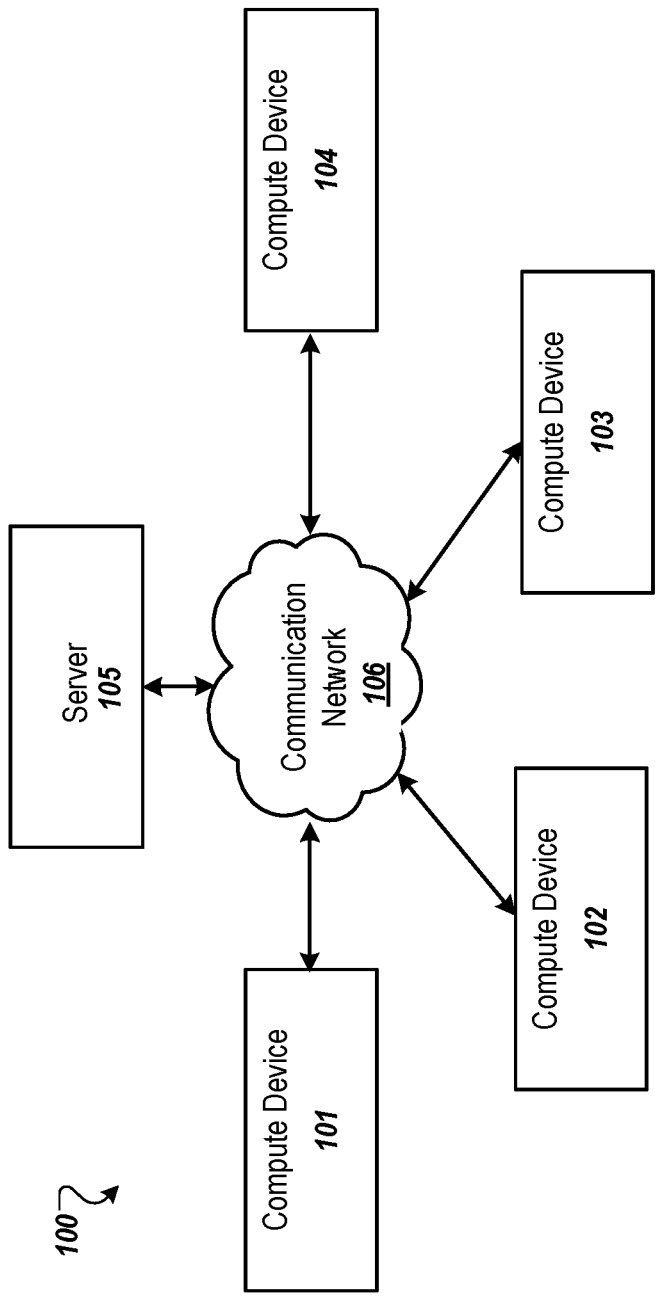
FIG. 1 is a schematic illustration of a smart patch management system, according to an embodiment.

In some embodiments, a method includes receiving, from each compute device from a set of compute devices, data associated with (1) a set of software applications installed on that compute device and (2) interactions between the set of software applications installed on that compute device and a set of system components of that compute device. The method includes identifying, based on the data, dependencies between the set of software applications installed on each compute device from the set of compute devices and the set of system components of each compute device. The method includes defining a set of dependency maps based on the dependencies. The method further includes receiving information related to potential deployment of a software patch; and predicting a group of system components likely to be altered by the software patch. The method includes predicting, based on the set of dependency maps and the group of system components likely to be altered by the software patch, a set of software applications likely to be affected by the software patch. The method further includes identifying, based on the set of software applications likely to be affected by the software patch, a subset of compute devices as test compute devices for the software patch. The method further includes sending a signal to deploy the software patch at each compute device from the subset of compute devices identified as test compute devices.

In some embodiments, a non-transitory processor-readable medium stores code representing instructions to be executed by a processor. The instructions can include code to cause the processor to receive, from a compute device, data associated with (1) a set of software applications installed on the compute device and (2) interactions between the set of software applications installed on the compute device and a set of system components of the compute device. The code can cause the processor to identify dependencies between the set of software applications and the set of system components, based on the data, and update at least one dependency map associated with the compute device. The code can further cause the processor to receive information related to potential deployment of a software patch at the compute device, and predict, based on the information, a group of system components likely incompatible with the software patch. The instructions can further include code to cause the processor to send a signal to deploy the software patch at the compute device in response to the dependency map indicating that the set of software applications are unlikely to interact with the group of system components.

In some embodiments, an apparatus includes a memory and a processor. The processor is configured to send a signal to deploy a software patch at a compute device. The processor is configured to identify, based on a dependency map, a set of system components on the compute device that are likely to be impacted by the software patch. The processor is further configured to monitor a set of parameters for a set of applications on the compute device and that interact with at least one system component from the set of system components. The processor is further configured to compare values for the set of parameters to one or more predefined criteria to determine a compatibility classification for the software patch. The processor can be further configured to update the dependency map based on the compatibility classification to define an updated dependency map, and based on the updated dependency map send a signal to deploy the software patch at a set of compute devices.

In some embodiments, an apparatus includes a memory and a processor operatively coupled to the memory. The processor can be configured to receive information related to interaction between system components and software applications from a set of compute devices, and build dependency maps between the system components and the software applications. The processor is configured to receive information from a set of test compute devices and related to a software patch deployed on the set of test compute devices and build dependency maps between the software patch and the system components that were altered by the software patch. In some embodiments, the processor can be configured to build prospective effect maps based on the dependency maps to predict the effects that may be encountered on software applications in a set of untested compute devices when the software patch is deployed in the set of untested compute devices.

FIG. 1 is a schematic illustration of a smart patch management system 100, also referred to herein as "an SPM system" or "a system". The smart patch management system 100 is configured to manage distribution and deployment of software patches to a set of compute devices 101-104 by building dependency maps between software patches and software applications. The smart patch management system 100 can evaluate new and/or untested or partially tested software patches, based on the dependency maps, to predict potential issues and proactively resolve the potential issues that may arise during deployment of the software patches, according to an embodiment. The SPM system 100 includes compute devices 101, 102, 103, and 104, connected to a smart patch management server 105 (also referred to as "the server") through a communications network 106, as illustrated in FIG. 1. While the system 100 is illustrated to include four compute devices 101-104, a similar SPM system can include any number of compute devices.

In some embodiments, the communication network 106 (also referred to as "the network") can be any suitable communications network for transferring data, operating over public and/or private networks. For example the network 106 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network. In other instances, the communication network 106 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 106 can be encrypted or unencrypted. In some instances, the communication network 106 can include multiple networks or subnetworks operatively coupled to one another by, for example, network bridges, routers, switches, gateways and/or the like (not shown).

The compute devices 101, 102, 103, and 104, in the SPM system 100 can each be any suitable hardware-based computing device and/or a multimedia device, such as, for example, a server, a desktop compute device, a smartphone, a tablet, a wearable device, a laptop and/or the like.

Figure 2:
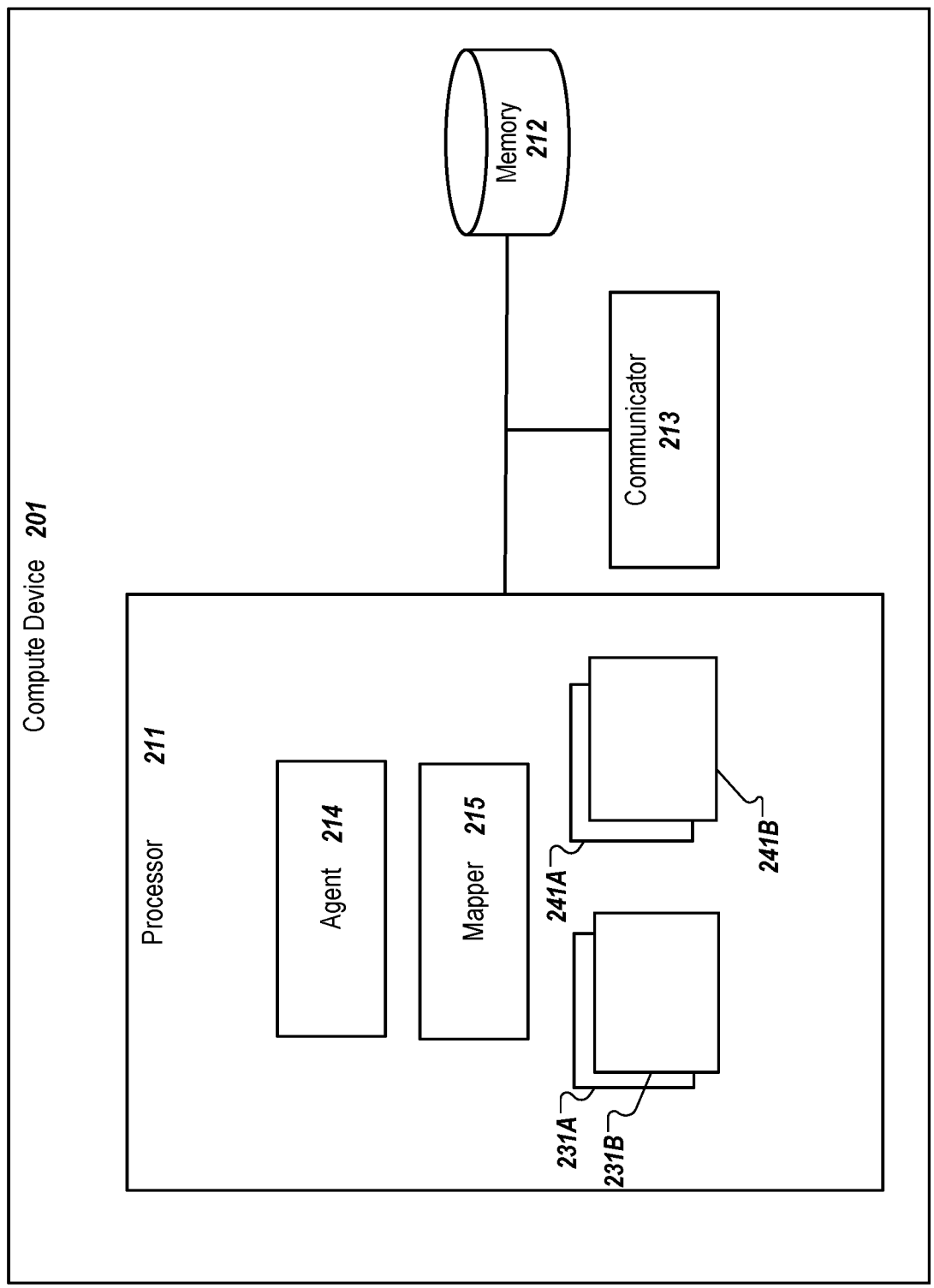
FIG. 2 is a schematic representation of a compute device within a smart patch management system, according to an embodiment.

FIG. 2 is a schematic block diagram of an example compute device 201 that can be a part of an SPM system such as the SPM system 100 described above with reference FIG. 1, according to an embodiment. The compute device 201 can be structurally and functionally similar to the compute devices 101-104 of the system 100 illustrated in FIG. 1. The compute device 201 can be a hardware-based computing device and/or a multimedia device, such as, for example, a server, a desktop compute device, a smartphone, a tablet, a wearable device, a laptop and/or the like. The compute device 201 includes a processor 211, a memory 212 (e.g., including data storage), and a communicator 213.

The processor 211 can be, for example, a hardware based integrated circuit (IC) or any other suitable processing device configured to run and/or execute a set of instructions or code. For example, the processor 211 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 211 can be operatively coupled to the memory 212 through a system bus (for example, address bus, data bus and/or control bus).

The processor 211 can be configured to receive software patches and associated instructions distributed by a server in an SPM system and install the received software patch following the associated instructions. In some embodiments, the processor 211 can be configured to maintain logs or schedules of software patches and associated instructions distributed by the server. The processor 211 can also be configured to maintain a log of information related to the installation of the received software patches (e.g., name or other identifier of the software patch, time and date of receiving the software patch with instructions and time, time and date or installation, etc.)

The processor 211 can include a data collection agent 214 (also referred to herein as "the agent"), a dependency mapper 215 (also referred to as "the mapper" herein), system components 231A and 231B and software applications 241A and 241B. In some embodiments, the system components 231A and 231B can be a process, program, utility, or a part of a computer's operating system, in the form of code that can be stored and executed by the processor 211. The system components 231A and 231B can be configured to, when executed by the processor 211, help to manage portions of the compute device 201. The system components 231A and 231B can each be configured to serve or contribute to specific functions such as process management, memory management, file management, access management, resource management, and the like. For example, the system components 231A and 231B can be dynamic link libraries (DLLs), executable system component files (EXEs), registry keys, and/or the like. The software applications 241A and 241B can each be any suitable software or code that when executed by the processor 211 can be configured to perform a group of coordinated functions, tasks, or activities for the benefit of a user of the compute device 201. Software applications 241A and 241B can be, for example, browser applications, word processing applications, media playing applications, JAVA based applications, image rendering or editing applications, text editing applications, and/or the like.

In some embodiments, each of the data collection agent 214, the dependency mapper 215, the system components 231A and 231B, and/or the software applications 241A and 241B can be software stored in the memory 212 and executed by processor 211. For example, each of the above mentioned portions of the processor 211 can be code to cause the processor 211 to execute the data collection agent 214, the dependency mapper 215, the system components 231A and 231B and/or the software applications 241A and 241B. The code can be stored in the memory 212 and/or a hardware-based device such as, for example, an ASIC, an FPGA, a CPLD, a PLA, a PLC and/or the like. In other embodiments, each of the data collection agent 214, the dependency mapper 215, and/or the system components 231A and 231B can be hardware configured to perform the respective functions. Moreover, while described herein as updating and/or patching software applications 241A and 241B, in other implementations, dependencies for hardware devices and/or applications (e.g., applications implemented on a hardware device such as an ASIC, an FPGA, a CPLD, a PLA, a PLC, etc.) can be maintained and patches can be applied to such hardware devices and/or applications.

The data collection agent 214 can be configured to run as a background process and collect data related to interactions between system components 231 and the software applications 241 in the compute device 201. For example, the data collection agent 214 can monitor, collect and/or store information related to interactions between each of the one or more system components 231 in the compute device 201 such as dynamic link libraries (DLLs), other suitable executable system component files (EXEs) and/or the like, and each of the software applications 241 installed and/or run in the compute device 201, by one or more users. In some instances, the data collection agent 214 can be configured to monitor and/or collect any suitable data related to the configuration or setup of the compute device 201 that may be useful in the consideration of potential deployment of software patches. For example, the agent 214 can be configured to monitor and/or collect data related to whether the compute device 201 can serve as a candidate test compute device, if the compute device 201 can be delayed in receiving a potential software patch. The data collected by the agent 214 can include a set of parameters associated with each of the software applications 241 installed and/or run in the compute device 201. For example, the set of parameters can include processor use, memory use, input/output use, or bandwidth use associated with a software application.

The data collected by the agent 214 can include data related to the compute device 201, data related to an operating system on the compute device 201 (e.g., types and/or versions of operating system(s)), identity of associated hardware and/or peripheral devices of the compute device 201, types and/or versions of security measures installed on the compute device 201, types of user privileges allowed on the compute device 201, types of access or exposure to malware threats of the compute device 201, number of users, hours or schedules of use, type of use (e.g., controlling sensitive equipment, linked to sensitive data, etc.) of the compute device 201 and/or the like. The agent 214 can further be configured to collect any suitable information that may be useful in the consideration of potential deployment of a software patch, such as whether the compute device 201 can serve as a candidate test compute device, if the compute device 201 can be delayed in receiving a potential software patch, etc.

In some instances, the data collection agent 214 can store the information collected in any suitable form such as, for example, in the form of text based narrative of events or interactions between system components and software applications. In some instances the data collection agent 214 can also analyze the data collected and store the results of the analysis in any suitable form such as, for example, in the form of interaction logs, or look-up tables, etc. The data collected by the agent 214 and/or the results of analyses can be stored for any suitable period of time in the memory 212. In some instances, the data collection agent 214 can be further configured to send the collected and/or analyzed data, via the communicator 213, to a server that may be part of an SPM system to which the compute device 201 is connected (e.g., the server 105 of the system 100 illustrated in FIG. 1). In some instances, the agent 214 can be configured to send the collected and/or analyzed data automatically (e.g., periodically with a predetermined frequency of communication) and/or in response to a query from the server.

The dependency mapper 215 can be configured to receive data and/or analyses from the data collection agent 214 and generate relationship maps of dependencies between software applications 241A and 241B in the compute device 201 and the system components 231A and 231B in the compute device 201. For example, the dependency mapper 215 can, in some implementations, be configured to build maps between specific software applications (e.g., JAVA-based application) and the system components on which each specific software application depends or uses for its execution and functioning. The dependency mapper 215 can generate the dependency maps between system components and software applications, and store these dependency maps in the memory 212 of the compute device 201. The dependency mapper 215 is further configured to send, via the communicator 213, either automatically (e.g., periodically with a predetermined frequency of communication) or in response to a query from a server of an SPM system (similar to the server 105 of the system 100 illustrated in FIG. 1) the dependency maps, the associated data collected and/or the results of analyses, to a server (e.g., a server similar to the server 105 illustrated in FIG. 1), as described in further detail herein.

The memory 212 of the compute device 201 can be, for example, a random access memory (RAM), a memory buffer, a hard drive, a read-only memory (ROM), an erasable programmable read-only memory (EPROM), and/or the like. The memory 212 can store, for example, one or more software modules and/or code that can include instructions to cause the processor 211 to perform one or more processes, functions, and/or the like (e.g., the data collection agent 214, the dependency mapper 215, the system components 231A and 231B and/or the software applications 241A and 241B). In some embodiments, the memory 212 can include extendable storage units that can be added and used incrementally. In some implementations, the memory 212 can be a portable memory (for example, a flash drive, a portable hard disk, and/or the like) that can be operatively coupled to the processor 211. In other instances, the memory can be remotely operatively coupled with the compute device. For example, a remote database server can serve as a memory and be operatively coupled to the compute device.

The communicator 213 can be a hardware device operatively coupled to the processor 211 and memory 212 and/or software stored in the memory 212 executed by the processor 211. The communicator 213 can be, for example, a network interface card (NIC), a Wi-Fi™ module, a Bluetooth® module and/or any other suitable wired and/or wireless communication device. Furthermore the communicator 213 can include a switch, a router, a hub and/or any other network device. The communicator 213 can be configured to connect the compute device 201 to a communication network (such as the communication network 106 shown in FIG. 1). In some instances, the communicator 213 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 213 can facilitate receiving and/or transmitting a file and/or a set of files through a communication network (e.g., the communication network 106 in the SPM system 100 of FIG. 1). In some instances, a received file can be processed by the processor 211 and/or stored in the memory 212 as described in further detail herein. In some instances, as described previously, the communicator 213 can be configured to send data collected and/or analyzed by the agent 214 to a server of an SPM system to which the compute device 201 is connected. The communicator 213 can also be configured to send data collected and analyzed by the dependency mapper 215 and the results of any analyses such as the dependency maps generated, to the server of an SPM system to which the compute device 201 is connected.

Figure 3:
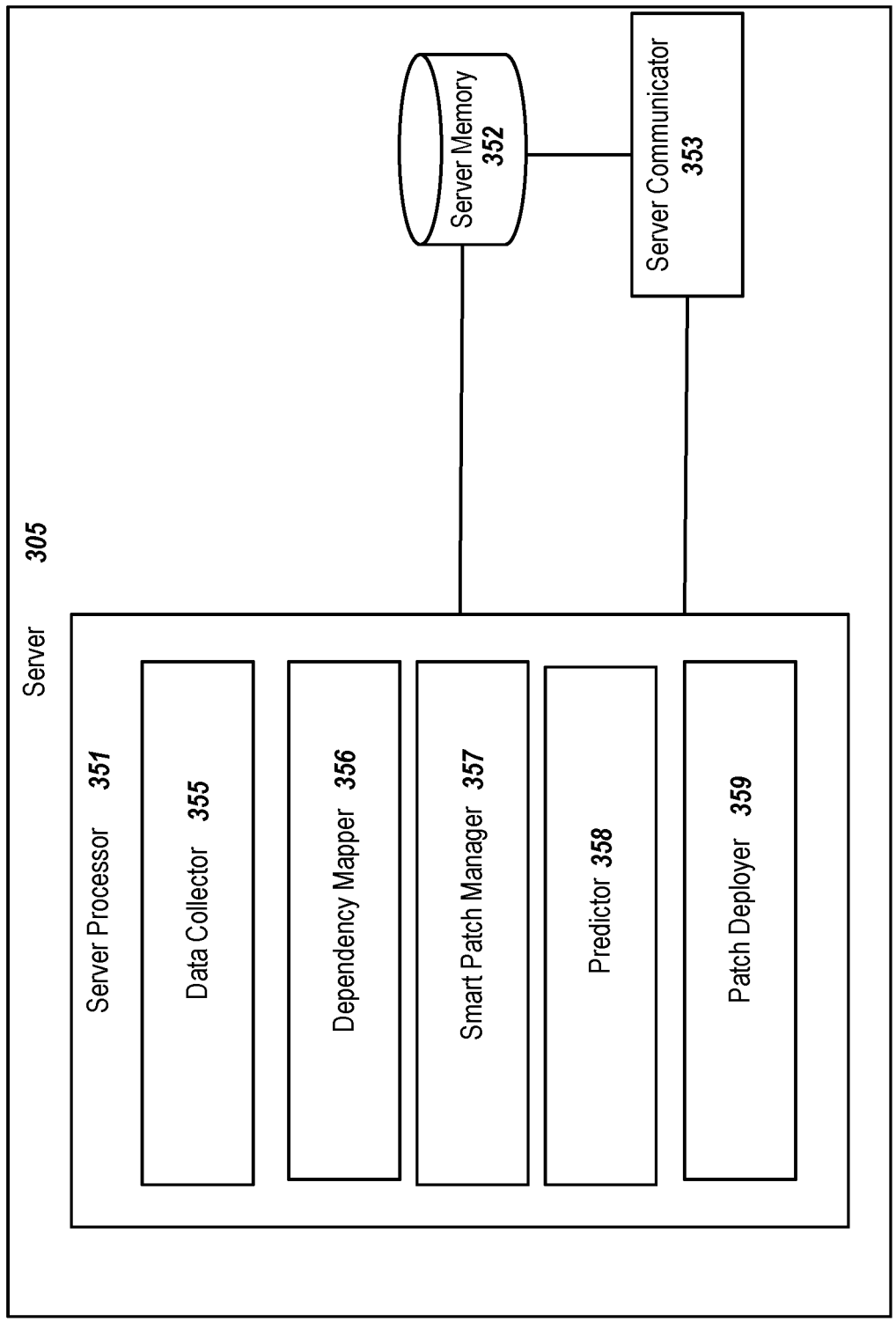
FIG. 3 is a schematic representation of a server within a smart patch management system, according to an embodiment.

Returning to FIG. 1, the compute devices 101-104 that are connected to SPM system 100 can be configured to communicate with an SPM server 105 via the communication network 106. FIG. 3 is a schematic representation of a server 305 that is part of an SPM system. The server 305 can be structurally and functionally similar to the server 105 of the system 100 illustrated in FIG. 1. The server 305 includes a server communicator 353, a server memory 352, and a server processor 351.

Similar to the communicator 213 within compute device 201 of FIG. 2, the server communicator 353 can be a hardware device operatively coupled to the server processor 351 and the server memory 352 and/or software stored in the server memory 352 executed by the server processor 351. The server communicator 353 can be, for example, a network interface card (NIC), a Wi-Fi™ module, a Bluetooth® module and/or any other suitable wired and/or wireless communication device. Furthermore the communicator 353 can include a switch, a router, a hub and/or any other network device. The server communicator 353 can be configured to connect the server 305 to a communication network (such as the communication network 106 shown in FIG. 1). In some instances, the server communicator 353 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

The server memory 352 can be a random access memory (RAM), a memory buffer, a hard drive, a read-only memory (ROM), an erasable programmable read-only memory (EPROM), and/or the like. The server memory 352 can store, for example, one or more software modules and/or code that can include instructions to cause the server processor 351 to perform one or more processes, functions, and/or the like. In some implementations, the server memory 352 can be a portable memory (e.g., a flash drive, a portable hard disk, and/or the like) that can be operatively coupled to the server processor 351. In other instances, the server memory can be remotely operatively coupled with the server. For example, the server memory can be a remote database server operatively coupled to the server and its components and/or modules.

The server processor 351 can be a hardware based integrated circuit (IC) or any other suitable processing device configured to run and/or execute a set of instructions or code. For example, the server processor 351 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The server processor 351 is operatively coupled to the server memory 352 through a system bus (e.g., address bus, data bus and/or control bus). The server processor 351 is operatively coupled with the server communicator 353 through a suitable connection or device as described in further detail.

The server processor 352 can be configured to include and/or execute several components, units and/or modules that may be configured to perform several functions, as described in further detail herein. The components can be hardware-based components (e.g., an integrated circuit (IC) or any other suitable processing device configured to run and/or execute a set of instructions or code) or software-based components (executed by the server processor 352), or a combination of the two. As illustrated in FIG. 3, the server processor 351 includes a data collector 355, a dependency mapper 356, a smart patch manager 357, a predictor 358, and a patch deployer 359.

The data collector 355 of the server processor 351 can be configured to receive communications between the server 305 and compute devices connected to the server 305 through suitable communication networks (e.g., compute devices 101-104 connected to the server 105 via the communication network 106 in the system 100 in FIG. 1). The data collector 355 is configured to receive, from the compute devices, information collected and/or generated by the one or more data collection agents in the compute devices (e.g., agent 214 of compute device 201 shown and described with respect to FIG. 2). The data from agents of various compute devices can, in some instances, include one or more logs or records or other data relating to interactions between system components and installed software applications, and one or more users. The data collector 355 is further configured to receive the dependency maps generated by dependency mappers in the compute devices (e.g., dependency mapper 215 on compute device 201 in FIG. 2). The dependency maps received from mappers from various compute devices can be in any suitable form such as maps (e.g., maps illustrated in FIGS. 4 and 5), look-up tables, text based lists of system components and/or software applications, etc.

In some instances, the data collector 355 can be further configured to receive, analyze, and store communications from compute devices regarding any suitable system information. The system information received from a compute device can include, for example, the type of compute device, the type and version of operating system running on the compute device, the type of hardware (e.g., processor, extended storage modules, etc.), peripheral devices associated with the compute device, the types of security measures and/or protection against malware installed, and/or the like. In some instances, the system information received from a compute device can include the types of system components and installed software applications on the compute device, the history of installation of software patches for the compute device, the history of any break or change in functionality due to installation of one or more software applications and/or software patches on the compute device, a frequency and/or an amount of use of specific system components and/or software applications on the compute device, a level of access to external sources or potential exposure to malware of the compute device, and/or the like.

The data collector 355, in some instances, can also be configured to receive usage information related to the connected compute devices, such as a usage profile including common functions performed by each of the connected compute devices. For example, in some instances, the data collector 355 can receive information related to whether a particular compute device is a personal device generally used by a single user (e.g., a personal desktop or laptop computer), or if the compute device is associated with and used by several users (e.g., of a work group). In some instances the compute device may be associated with other hardware or equipment and be accessible to any user with appropriate credentials. For example, the compute device may be used to run sensitive or high demand equipment, or the compute device may be a local server. The data collector 355 can be further configured to receive information related to use of a compute device such as hours of operation and/or schedules of heavy or light processing load on the compute device. The data collector 355 can be configured to receive information about the types of operations or services supported by a compute device such as text editing, image processing, data processing, mathematical modelling, accessing and searching remote databases, hardware control, and/or the like. The data collector 355 is configured to receive data and store the data in a suitable manner in the server memory 352 such that other units, components or modules of the server 305 can use the data for further processing.

Figure 4:
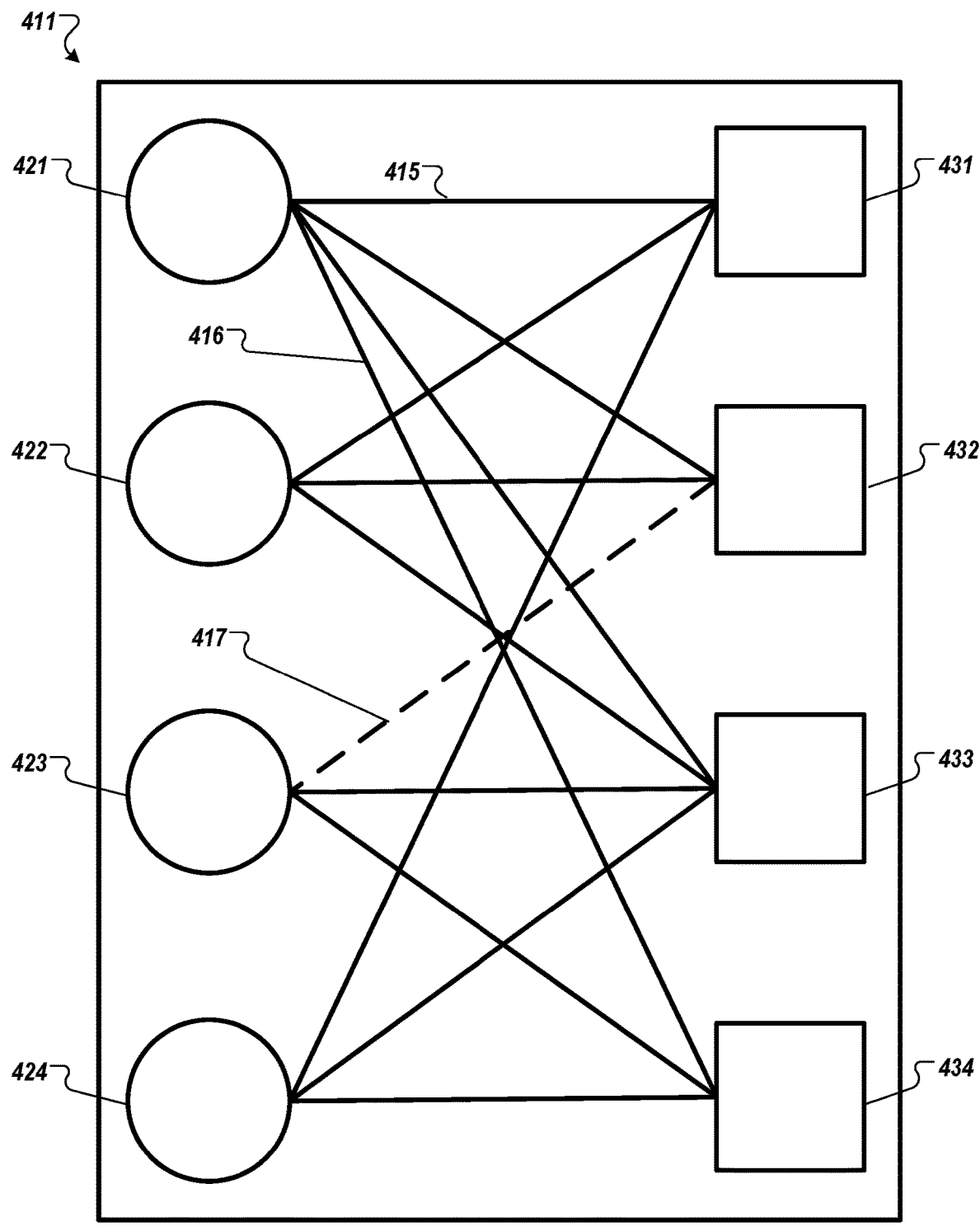
FIG. 4 is a schematic representation of a dependency map between potential software patches and the system components of compute devices with which the patches may interact, according to an embodiment.
Figure 5:
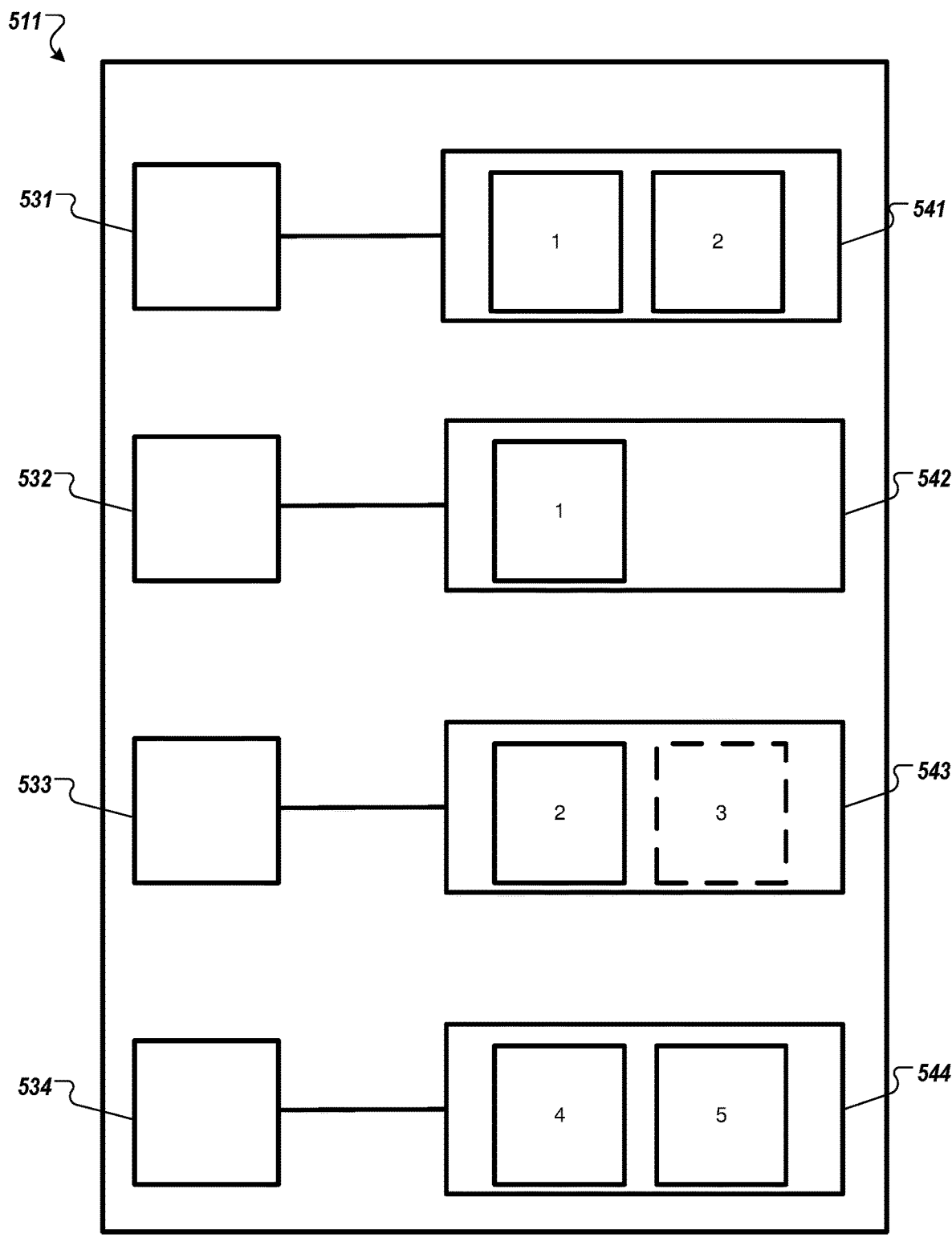
FIG. 5 is a schematic representation of a dependency map between system components in compute devices and software applications installed on the compute devices, according to an embodiment.

The server processor 351 includes a dependency mapper 356 that can be configured to generate and/or update one or more dependency maps such as dependency maps between software patches and known system components, and dependency maps between system components and software applications installed in compute devices within the SPM system (e.g., the example dependency maps 411 and 511 illustrated in FIGS. 4 and 5, respectively). In some instances, the dependency mapper 356 can generate one or more generalized or specific dependency maps that can be applicable to groups of compute devices or a specific compute device, respectively. For example, the dependency mapper 356 can use data collected and stored by the data collector 355 to generate dependency maps between system components and software applications for a specific compute device or a specific set of compute devices. For example, the dependency mapper 356 can generate a set of generalized dependency maps between system components and software applications in a set of compute devices that run on a particular kind of operating system (OS) (e.g., Windows, MacOS, Linux, etc.) within the SPM system. As another example, the dependency mapper 356 can generate a set of generalized dependency maps between system components and software applications in a set of compute devices that are used for a common purpose such as, for example, text or image editing, or a set of compute devices that extensively use a set of system components or associated software applications such as, for example, a system component DLL "c: ava.jre.dll" and/or JAVA based applications. As another example, the dependency mapper 356 can generate a set of generalized dependency maps between a software patch and system components that might be altered by that software patch in a set of compute devices that are used to operate equipment or machinery, and use one or more software applications to interface with the hardware.

In some instances, the dependency mapper 356 can assimilate data obtained from the compute devices to generate the dependency maps between system components and software applications. In some instances, the dependency mapper 356 can assimilate previously generated dependency maps between system components and software applications that may be specific to one or more compute devices and can modify, update, or combine the dependency maps to generate new dependency maps. For example, dependency mapper 356 in server processor 351 can receive device specific dependency maps generated by mappers within individual compute devices (e.g., the mapper 215 of compute device 201 in FIG. 2) and combine the device specific dependency maps received from multiple similar compute devices (e.g., devices running the same OS, using similar hardware, etc.) to generate new generalized dependency maps. In some instances, the dependency mapper 356 can receive dependency maps generated by mappers within a first compute device with a particular configuration (e.g., running a particular version of a particular OS) and using data collected by a data collector 355, update the dependency map to be applicable to one or more compute devices that may be similar in configuration to the first compute device but have some differences (e.g., devices running a different version of the same OS as the first compute device). In some instances, the dependency mapper 356 can use data collected by the data collector 355 and/or information received by the smart patch manager 357 about new software patches to be distributed, and generate dependency maps between potential software patches and system components of one or more compute devices.

The server processor 351 includes a smart patch manager 357 that is configured to receive, from vendor or suppliers of software applications and/or software patches, new and/or updated software patches to be deployed. The smart patch manager 357 can be configured to manage logs or schedules of software patches to be distributed and the compute devices to which they are to be distributed. In some embodiments, the smart patch manager 357 can receive a schedule of a set of software patches that are to be distributed and deployed in a set of compute devices. The smart patch manager 357 can be configured to aggregate, classify and/or group the set of software patches according to one or more software patch families based on predetermined criteria met by the set of software patches. In some implementations, the smart patch manager 357 can be configured to identify properties of software patches from the information received along with the software patches. For example, the smart patch manager 357 can identify that a software patch named JDK 18_222 is a Java software patch and aggregate, classify and/or group the software patch into a Java-related software patch family. The smart patch manager 357 can use the identified properties of the software patches and the aggregated software patch family information to generate dependency maps and/or prospective effect maps for one or more compute devices.

The smart patch manager 357 is configured to use data obtained by the data collector 355 to monitor and maintain a history of connected compute devices in an SPM system of the server 305, past history of software patches distributed and patches deployed in each compute device, the outcomes of deployment of specific software patches, and user or compute device provided feedback or input regarding system function that may or may not be related to patch deployment. In some embodiments, the smart patch manager 357 can be configured to generate system profiles for compute devices connected to the SPM system, based on compute device specific information collected by the data collector 355. For example, the smart patch manager 357 can generate system profiles for individual compute devices in the SPM system based on the details specific to each compute device such as, for example, type and version of system components and software applications running on the compute device, operating framework and associated hardware, type and amount of use, level of malware protection, etc. Such a system profile can be used to generate dependency maps, as described herein.

The server processor 351 further includes a predictor 358 configured to use dependency maps generated by the dependency mapper 356 to perform predictions of effects of patch deployment. In some instances, the predictor 358 can be configured to generate one or more prospective effect maps, as described in further detail herein. In some instances, the predictor 358 can generate one or more prospective effect maps to predict effects that may be encountered on system components and/or software applications in specific compute devices or specific types of compute devices upon deployment of a particular software patch. In some instances, the predictor 358 can include a machine learning model that generates and/or updates prediction maps based on incoming data from compute devices, software patch vendors and/or test compute devices that have undergone test deployments of particular software patches. In some instances, the predictor 358 can be configured to work in collaboration with one or more other components of the server processor 351 (e.g., the smart patch manager 357) to generate and/or maintain one or more smart patch distribution profiles for one or more compute devices connected to the server. For example, compute-device-specific smart patch distribution profiles can include, for example, compatibility profiles for deployment of one or more software patches, test candidate profiles for testing effects of potential software patches, etc., to manage safe and efficient distribution and deployment of software patches.

The server processor 351 further includes a patch deployer 359 configured to use the information from dependency maps generated by dependency mapper 356 and/or prediction maps generated by predictor 358, and deploy particular software patches to particular target compute devices. In some instances, the patch deployer 359 can work with the smart patch manager 357 to deploy one or more patches in a safe and targeted manner. For example, in some instances, the smart patch manger 357 can use the information from one or more prediction maps to identify one or more candidate compute devices that can serve as test compute devices to test the deployment of a particular software patch, and the patch deployer 359 can communicate with the selected candidate compute device and distribute the software patch to be tested. The patch deployer 359 can be configured to monitor and maintain suitable logs or records of software patches deployed and the compute devices to which the patches have been deployed.

While the server 305 is described to have one each of a data collector, a dependency mapper, a smart patch manager, a predictor and a patch deployer, in other embodiments, a server similar to the server 305 can be configured with several instances of the above mentioned units, components, and/or modules. For example, in some embodiments, the server may include several data collectors and several dependency mappers associated with one or more compute devices or groups of compute devices. In some embodiments, the server may include several predictors assigned to perform certain kinds of predictions such as, for example, to predict components that are likely to be affected in a specific group of compute devices, to predict software applications that are likely to be affected in a specific group of compute devices, etc.

The compute device 201 in FIG. 2 is described to have a dependency mapper 215 configured to generate and/or update dependency maps specifically applicable to the compute device 201, and the server 305 in FIG. 3 is described to include a dependency mapper 356 configured to generate and/or update dependency maps that may be applicable to individual compute devices and/or to generate generalized dependency maps that may be applicable to groups of compute devices. In some embodiments, the server in an SPM system may include a dependency mapper (similar to the dependency mapper 356 of the server 305) and the compute devices in the SPM system may not include a dependency mapper. The dependency mapper included in the server of the SPM system, in such embodiments, may be configured to receive the data collected from agents within compute devices via the data collector of the server, and perform the functions related to generating and/or updating dependency maps described herein with respect to dependence mapper 215 of FIG. 2.

While the server 305 is described herein to have a data collector, a dependency mapper, a smart patch manager, a predictor and a patch deployer, in other embodiments, a server similar to the server 305 can be configured such that portions of the above described functions and/or modules can be carried out in and/or executed by compute devices that are included in the SPM system (e.g., compute device 201) for example, via client side applications installed in the compute devices (e.g., within agent 214 of FIG. 2). Similarly stated, in some instances, functions described as being performed on a server (e.g., server 305) can be performed on a compute device 201 and vice versa.

FIG. 4 illustrates an example dependency map 411 that can be generated by an SPM server (e.g., server 105, server 305) relating a set of software patches 421, 422, 423, and 424, with a set of system components 431, 432, 433, and 434. The lines 415 indicate the relationship between each software patch 421-424 and the system components 431-434 that are likely to be affected by the software patch when installed. The set of software patches 421-424 can be software patches received by a server of an SPM system to be distributed to a set of compute devices within the SPM system (e.g., the system 100 in FIG. 1). In some implementations, the set of compute devices can be a group of compute devices within the SPM system that have comparable system components (e.g., including the set of system components 431-434).

In some instances, the server can receive data from external remote sources (e.g., vendor servers that distribute software patches or remote databases that distribute software patches) and/or data from the compute devices within the SPM system and, based on the data, generate the dependency map 411. For example, a received software patch JDK 18-222 can be identified as a JAVA-related software patch and that the JAVA related software patch updates the system component "d:\java\jre.dll". Thus, a line can be indicated between the software patch JDK 18-222 and the system component jre.dll because the software patch JDK 18-222 affects the system component jre.dll.

In some instances, the dependency map 411 can include different types of lines 415 indicating different types of relationships between a software patch and a system component, as shown by solid lines 416 and dashed line 417 in FIG. 4. The solid lines 416 can indicate known changes or effects on system components due to installation of a software patch. For example, the solid lines connecting the software patch 423 to the system components 433 and 434 indicate known effects or changes in the system components 433 and 434 due to installation of the software patch 423. The dashed line 417 can indicate a predicted (but not yet known) effect and/or change in a system component due to the installation of a software patch. For example, the dashed line connecting the software patch 423 to the system component 432 can indicate that although unknown to have a relationship, the system component 432 is predicted to be affected or changed in some form due to the installation of the software patch 423.

In some instances, the dependency map 411 can be generated by an SPM server for software patches 421-424 that are new and untested software patches. In some other instances, the dependency map 411 can be generated for software patches 421-424 that have previously been partially tested in a set of test compute devices. The dependency map 411 can be applicable to a generalized set of compute devices connected to the SPM server. For example, the dependency map 411 can be applicable to a set of compute devices running the same operating system, having the same hardware configuration, having a similar software configuration, and/or the like.

While the dependency map 411 is illustrated to be in the form of a schematic map associating a set of software patches with a set of system components, a similar dependency map relating software patches to system components can be generated, stored, represented, used, and/or presented for further analysis by an SPM system in any suitable form. For example, in some instances such dependency maps can be in the form of look-up-tables, text based lists, etc.

FIG. 5 illustrates an example dependency map 511 relating a set of system components 531-534, within a compute device, to collections of software applications 541-544 that may depend on or be affected by changes to the system component 531-534. For example, the dependency map 511 can generate relationship indicators to represent that a software application A, uses the system component DLL "c: ava.jre.dll". The dependency map 511 can be generated by a processor of an SPM server (e.g., server 105 or server 305 described herein). The lines 515 indicate the relationship between each system component and the corresponding collection of software applications that may depend on or be affected by changes to the system component. The changes to the system component may be caused, for example, by the installation of a software patch.

In some instances, the set of system components 531-534 can be within a particular compute device connected to an SPM system. In some instances, the set of system components 531-534 can be system components found within each compute device from a group of compute devices within an SPM system. In some instances, the group of compute devices can be similar in some predefined manner. For example, the set of system components 531-534 can be common system components found within compute devices running a particular operating system, compute devices handling a particular set of hardware or peripheral devices, compute devices commonly tasked with a specific set of operations, etc. In some instances, the set of collections of software applications 541-544 can be collections of software applications that depend on and/or are directly or indirectly affected by changes to the associated system component. The dependency map 511 can be generated by an SPM server (e.g., the server 105 in FIG. 1, or server 305 illustrated in FIG. 3). The server can receive data from the compute devices connected to the SPM system and based on the data generate the dependency map 511. While described herein as being generated by a mapper in a server within an SPM system, in some implementations, the dependency map 511 can be generated by a mapper included in a compute device within an SPM system (e.g., the mapper 215 in compute device 201 in FIG. 2). Such a dependency map can then be provided to the server.

In some instances, the dependency map 511 can include software applications that are known to depend on certain system components such as the collection of software applications 541 including software applications 1 and 2 that directly depend on the system component 531. In some instances, the dependency map 511 can include software applications, indicated by dashed lines in FIG. 5 that are predicted to depend on and/or be otherwise affected by changes to a system component. For example, in the collection of software applications 543, the software application 2 can be known to depend on the system component 533 to function properly whereas the software application 3 can have no known direct dependence on the system component 533 to be functional. The SPM server, however, can receive data from the connected compute devices and analyze the data to predict that the software application 3, in the software environment including the software applications 543, will be indirectly dependent on and/or affected by changes to the system components 533. The SPM server thus can include the software application 3 in the collection of software applications 543 that is predicted to be affected by changes to the system component 533.

As described previously with respect to the dependency map 411, while the dependency map 511 is illustrated to be a schematic map associating a set of system components with collections of software applications, such a dependency map can be generated, stored, represented, used, and/or presented for further analysis by an SPM system in any other suitable form. For example, in some instances dependency maps can be in the form of look-up-tables, text based lists, etc.

Figure 7:
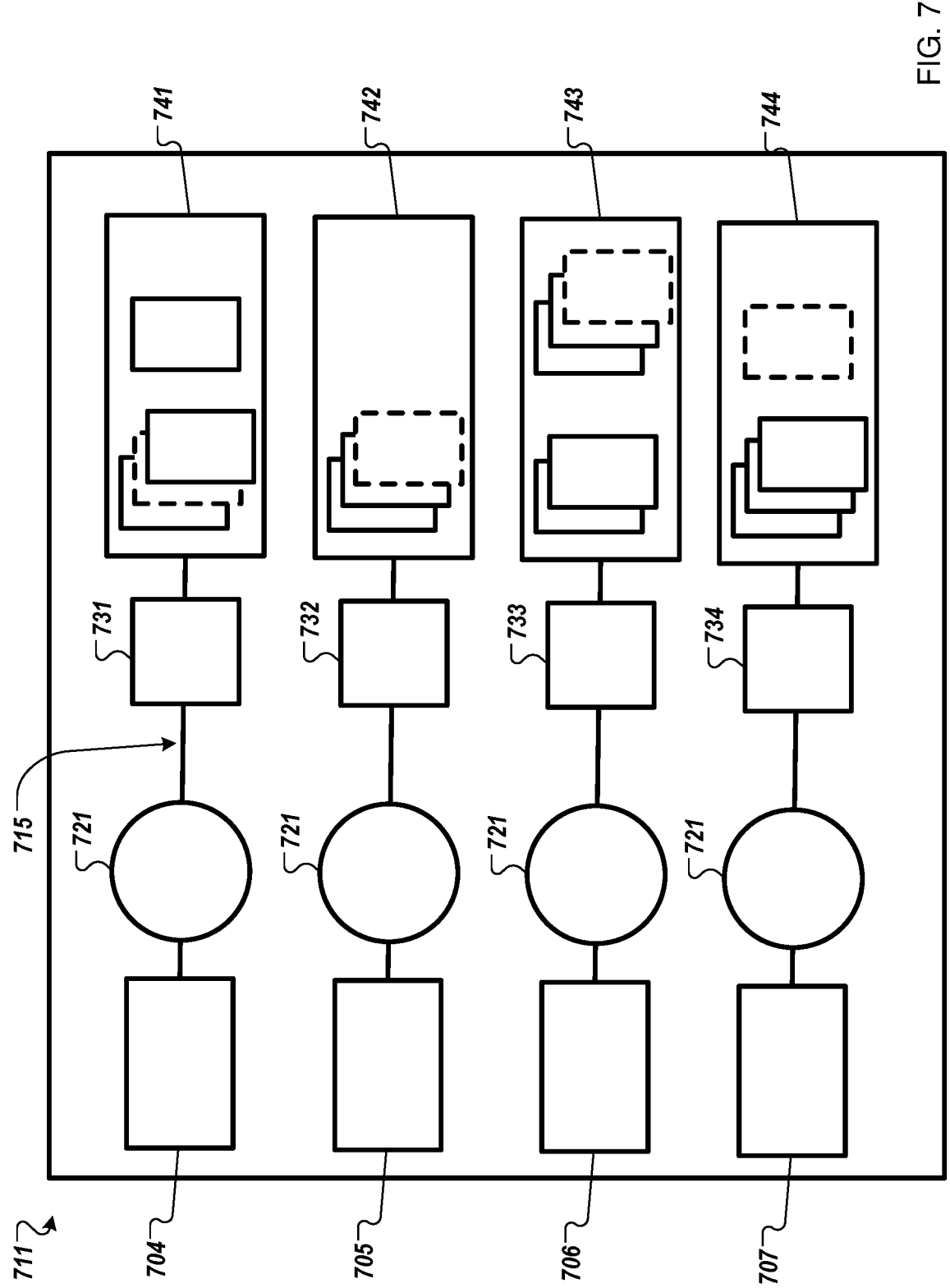
FIG. 7 is a schematic representation of a prospective effect map of several compute devices, and the effects of potential deployment of a software patch on the system components and the installed software applications in each compute device, according to an embodiment.

Returning to FIG. 1, in use, the data collection agents in compute devices 101-104 within the SPM system can monitor and collect data related to the interaction between system components and software applications, and data related to the configuration or setup of the compute device. In some instances, the agents can additionally collect information related to the deployment and/or installation of one or more software patches. In some instances, the agents can also be configured to collect information related to user interaction with the compute device and any input from the user (e.g., user input regarding errors in software applications encountered or previous installations of software patches). In some instances, the collected data can be used to generate or update dependency maps by the dependency mappers within the compute devices 101-104. The collected data and/or the dependency maps can then be sent to the SPM server 105 via the communication network 106. The SPM server 105 receives the data collected by agents and/or data generated by a mapper from the compute devices and uses this information to generate and/or modify other dependency maps (e.g., generalized dependency maps that apply to more than one compute device). In some instances, the collected data in compute devices can be sent to the SPM server and the dependency maps can be generated by dependency mappers in the server. The server can use the dependency maps to generate prospective effect maps, which are maps predicting prospective effects of installing a software patch in a compute device of a group of compute devices. An example prospective effect map is illustrated in FIG. 7 and described below.

Figure 6:
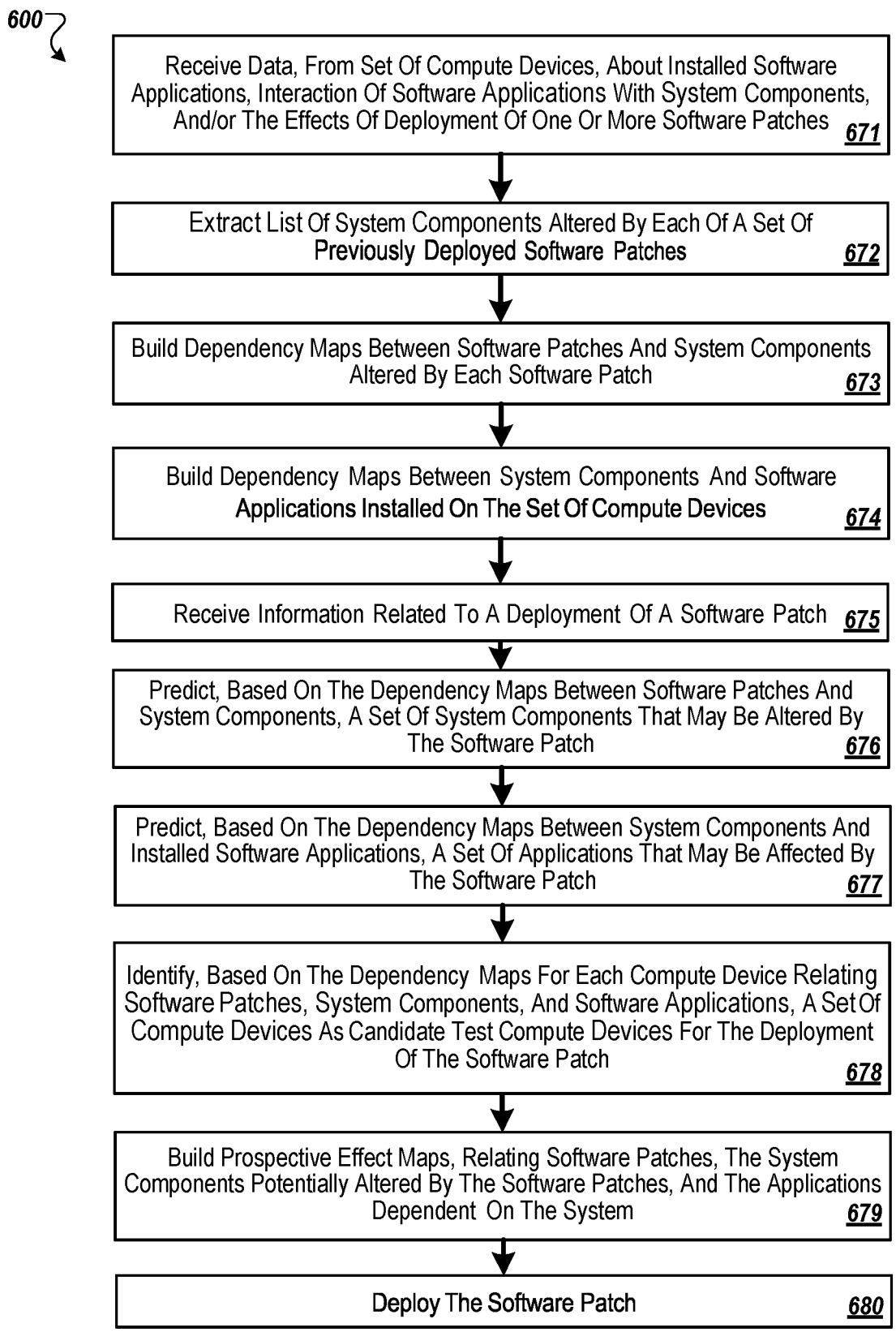
FIG. 6 is a flowchart describing a method of building and using dependency maps between software patches, system components and software applications, according to an embodiment.

FIG. 6 illustrates an example method 600 of using the data received from the compute devices to generate dependency maps and prospective effect maps at an SPM server (e.g., server 105, 305). At 671, the SPM server receives data from a set of compute devices. The data received can be about a set of software applications installed within each of the set of compute devices, interactions of the set of software applications with a set of system components within the set of compute devices, and/or the effects of deployment of one or more software patches. As described previously, the data received from compute devices can include a list of software applications installed in each compute device, and usage and interactions between the system components of each compute device and the listed software applications of that compute device. The data received can also include documentation of effects of previous deployments of software patches in each compute device from the set of compute devices. In some instances, the data can include a history of installation of software patches that were previously deployed and the ensuing effects in the respective compute devices, such as breakdown or dysfunction in software applications. In some instances, the data can include information related to the configuration and/or setup of the compute devices, as described herein. In some instances, the SPM server can additionally receive additional information about one or more software patches that are to be deployed and installed in the set of compute devices.

At 672, the SPM server extracts a list of system components that are altered, changed or modified by each of a set of previously-deployed software patches. In some instances, the list of system components modified by a previously-deployed software patch can be directed to or applicable to a specific group of compute devices. For example, the list of system components modified by a previously deployed software patch can be classified by groups of compute devices running the same operating system, having the same operational or functional requirements (e.g., compute devices used for image processing, etc.) and/or the like.

At 673, the SPM server builds and/or defines dependency maps between software patches and system components altered by the software patches. The SPM server can identify, based on data received from a compute device, dependencies between the set of software applications and the set of system components included in the compute device. In some instances, the SPM server can update a dependency map associated with the compute device. For example, the SPM server can build dependency maps similar to the dependency map 411 described with reference to FIG. 4.

In some instances, the dependency maps between software patches and system components generated at 673 can be applicable to a group of compute devices. In some instances the dependency maps can be generated for individual compute devices connected to the SPM system. In some instances a combination of dependency maps applicable to groups of compute devices and dependency maps specific to each compute device can be generated and/or used.

At 674, the SPM server builds and/or defines dependency maps between system components and software applications installed on the set of compute devices. The SPM server uses information received from the compute devices and/or system profiles to build dependency maps similar to the dependency map 511 illustrated in FIG. 5, between system components and software applications installed on the set of compute devices. As described previously, in some instances, the dependency maps between system components and software applications generated at 674 can be applicable to a group of compute devices. In some instances the dependency maps can be generated for individual compute devices connected to the SPM system, and in some instances, a combination of dependency maps applicable to groups of compute devices and dependency maps specific to each compute device in the SPM system can be generated and/or used.

At 675, the SPM server receives information related to a deployment of a software patch. For example, the SPM server can receive information related to a potential deployment of a software patch at a particular compute device from which the SPM server has received data and identified dependencies between software applications and system components. Based on the identified dependencies the SPM server may have updated one or more dependency maps associated with the particular compute device. In some instances, the software patch can be new and/or untested. In some instances, the software patch can be partially tested with respect to system components and/or software applications common within the SPM system.

At 676, the SPM server predicts, based on the dependency maps between software patches and system components, a set of system components that may be altered by the software patch received at 675. As an example, the SPM server can predict, based on information related to a potential deployment of a software patch at the particular compute device described above, a group of system components likely to be impacted by installation of the software patch. For example, if the software patch is a Java-related software patch, the predictor in the SPM server (e.g., predictor 358 in the SPM server 305 in FIG. 3) can use the appropriate dependency map to predict that the system component "c: ava re.dll" may be changed.

At 677, the SPM server can predict, based on the dependency maps between system components and installed software applications, a set of applications that may be affected by the software patch. As an example, the SPM server can predict based on information related to a potential deployment of a software patch at the particular compute device described above, a group of system components likely incompatible with the installation of the software patch. For example, having identified a Java-related software patch and having predicted, at 676, that the system component "c: ava re.dll" may be changed by the software patch, the SPM server can use the appropriate dependency maps generated at 674 for JAVA-related software applications to predict the list of software applications that may be affected by the software patch. In some instances, the information can be derived by previous installations of similar software patches (e.g., monitoring the impact such an installation had on the compute device). In some instances, the SPM server can additionally use information provided by a user to generate predictions of which software applications may be affected due to installation of a software patch. The SPM server can perform predictions of which system components, and/or software applications may be affected by a software patch for groups of compute devices and/or for individual compute devices.

At 678, the SPM server identifies, based on the dependency maps for each compute device relating software patches, system components, and software applications, a set of compute devices that can serve as candidate test compute devices for the deployment of the software patch. The SPM server uses dependency maps relating software patches to system components, and dependency maps relating system components to software applications, that are applicable to each compute device within an SPM system, and generates a prediction of expected effects on each compute device in the SPM system. In some instances, the SPM server can determine, based on at least one dependency map associated with a compute device, that a set of software applications at the compute device are unlikely to interact with a group of system components predicted to be incompatible with the installation of a software patch and/or predicted to be adversely impacted by the installation of a software patch. In some instances, based on this determination, the SPM server can send a signal to deploy the software patch at the compute device.

In some instances, the SPM server can calculate a risk of deployment of a software patch (e.g., a Java software patch) on each of the connected compute devices. The risk calculation can use a suitable metric (e.g., a percentage, a ratio, a numeric ranking, etc.) to quantify and compare relative risk between various compute devices. Based on the prediction of effects on each compute device in the SPM system, the SPM server identifies a set of compute devices that can serve as candidate test compute devices for the deployment of the software patch. The SPM server can use additional information related to the compute devices to identify the candidate test compute devices. For example, information related to usage, sensitivity, requirement of down-time in the event of a breakdown of an application, etc.

At 679 the SPM server builds prospective effect maps, relating software patches, the system components potentially altered by the software patches, and the applications dependent on the system components altered by the software patches. The SPM server uses the dependency maps generated at 673 and 674 and the predictions from 676, 677, and 678, to build prospective effect maps that apply to particular compute devices or particular groups of compute devices within the SPM system. For example, the predictor in the SPM server (e.g., predictor 358 of SPM server 305 in FIG. 3) can be used to build the prospective effect maps. The prospective effect maps are configured to indicate relationships between software patches and system components potentially altered by the software patches. The prospective effect maps are further configured to indicate the software applications installed in the particular compute devices or groups of compute devices that may be dependent on or affected by changes to the system components altered by the software patches. The prospective effect maps generated can be sent to a smart patch manager of the SPM server to update the management strategies used by the smart patch manager to organize the maintenance, distribution, and/or deployment of software patches in an SPM system. For example, using the prospective effect maps the smart patch manager can make calculated risk assessments of deploying a software patch in a set of compute devices, or withholding deployment from a set of compute devices until further notice.

At 680 the SPM server deploys the software patch. The SPM server deploys the software to a set of targeted compute devices such as candidate test compute devices via, for example, a patch deployer following instructions from a smart patch manager, with consideration to the prospective effect maps generated at 679. In some instances, the steps of predicting, based on dependency maps, the set of system components and/or software applications that may be altered by a software patch, at 677 and 688, and of building prospective effect maps at 679, can be repeated for multiple groups of compute devices and/or for multiple software patches.

As described above, the SPM servers described herein (e.g., servers 105, 305) can be configured to generate prospective effect maps to predict the effect of installation of software patches on a set of compute devices, as described previously herein. FIG. 7 illustrates an example prospective effect map 711 that can be generated by an SPM server (e.g., server 105 and/or server 305). The prospective effect map 711 can be used to predict the effects of installation of a particular software patch 721 on the compute devices 704, 705, 706, and 707. The prospective effect map 711 can be generated by an SPM server based on one or more dependency maps also generated by the SPM server (e.g., dependency maps 411 and 511 described with reference to FIGS. 4 and 5, respectively). The SPM server may also use information received from the compute devices 704-707 via one or more data collection agents (e.g., agent 214 of the compute device 201) or dependency mappers (e.g., mapper 215 of compute device 201) to generate the prospective effect map 711.

As illustrated in FIG. 7, the prospective effect map 711 can indicate relationships between the software patch 721 and system components within each compute device that may be modified, changed or altered by the software patch 721. For example the software patch 721 can change the system component 731 in compute device 704, the system component 732 in compute device 705, etc. The prospective effect map 711 further includes relationship indicators between the system components of each compute device and the collection of software applications that depend on and/or are affected by changes to that system component. For example, the prospective effect map 711 illustrates the relationship between the system component 731 in the compute device 704, and the collection of software applications 741 that depend on or are affected by changes to the system component 731 that may be caused by the installation of software patch 721. The collection of software applications 741 in the compute device 704 includes software applications with known direct dependency on the system component 731 indicated by solid rectangles and software applications that have no known dependency on the system component 731 but are predicted to be affected by changes to the system component 731, indicated by dashed rectangles. The prospective effect map 711 can identify which compute devices can serve as test compute devices, as well as identify which applications within the compute devices (test compute devices as well as non-test compute devices) may not work or may not work as intended once the software patch is deployed.

In some instances, the prospective effect maps can incorporate secondary information or secondary considerations that may be useful for the distribution and deployment of software patches. For example, the prospective effect map 711 can include information about what may be the best time to install the software patch in a particular compute device (e.g., when a user is expected to not use a software application that might be affected). In some instances, the prospective effect map can include and/or predict information such as whether a reboot is expected upon deployment of the software patch and whether a reboot is permitted in the compute device in consideration (e.g., a test compute device). In some instances, the prospective effect map can also include user reported or user provided information. For example, the user may provide and/or the agent (e.g., agent 214 shown in FIG. 2) can collect information related to use of the compute device and/or use of software applications in the compute device, which can be included in generating the prospective effect maps.

In some embodiments, the SPM system can be used to monitor and gather information related to secondary effects of installation of software patches. For example, the SPM server can be used to predict if a reboot of a compute device will be required following the installation of a software patch. In some instances, the software patch can be installed in a set of test compute devices and the agents in the test compute devices can monitor, collect and transmit, to the SPM server, data related to which software applications were "locking" files from being updated. For example, as a result of installation of a software patch "P" a file "X" may need to be updated. As another example, while the software patch installer may try to update file "X", the file "X" may be locked by another software application "Y". In some instances, the SPM server can receive information from a compute device via the agents or mappers of that compute device or through a user input, that a reboot is needed when installing a software patch "P" in a compute device with a specific application. In some instances, the SPM server can transmit information to the compute device to alert the user, with suitable messages that a reboot may be required, or that a software application needs to be closed for the installation of the software patch to progress. The SPM system can learn from the effects of installation of the software patch in the test compute devices whether a reboot is required, and use this information in the further distribution of the software patch to other compute devices.

In some instances, the SPM server can query and/or or receive information from users of compute devices to gather information related to effects of installation of a software patch. For example, the SPM server can query the user whether a software application caused a failure to successfully install a software patch or if a software application has been observed to breakdown in function following an installation of a software patch. For example, in the event of a broken application following installation of a software patch, the compute device can provide a list of software applications that have been running on the compute device around the time of the installation of the software patch. The compute device can present, in the list, names of software applications as may be familiar to the user (e.g., as reported by the operating system of the user) and request that the user select the software application that is broken. When the user selects the software application that is broken, the compute device can provide an indication to the SPM server and the SPM server can determine the software patch that likely impacted the user reported software application. In some instances, the SPM server can store the user's input and use the information to further update, modify and/or define dependency maps.

In some instances, the SPM server can receive and/or generate data configured to update one or more dependency maps (e.g., dependency maps that relate the scheduled software patches and system components in the set of compute devices that may be changed by the scheduled software patches, dependency maps that relate the scheduled software patches and software applications running on the set of compute devices that may be impacted by the scheduled software patches). The data can further be used to generate dependency maps between system components within compute devices and the software applications installed on the compute devices that depend on or are affected by changes to the system components.

In some instances, upon the installation of a software patch at a compute device, the SPM server can receive an indication of an application affected by the software patch. Based on the indication, the SPM server can use the information to update one or more dependency maps associated with the compute device and/or the software patch.

In some instances, the SPM server can receive, from a compute device, information related to crashes and/or an unexpected termination of one or more installed software applications. In some instances, the information can be received in response to querying the compute device, in response to the compute device detecting a crash and/or the like. In some instances, the SPM server and the compute devices can be programmed such that the SPM server automatically receives information related to crashes and/or an unexpected termination of installed software applications. The information can be, for example, in the form of a crash report including the identity of the software application that crashed, terminated unexpectedly, and/or lost some or all of its functionality. The crash report may also, in some instances, include information related to change in behavior of software applications (e.g., newly observed interactions between the software application and certain system components that were not previously observed). The crash report can also include information related to potential relationships between the events of loss in functionality of the software application and software patches that were deployed in that compute device before the events. Thus, the SPM can develop possible links between a software crash and/or unexpected termination and a recently installed software patch.

In some instances, the SPM server (e.g., the server 105, and/or the server 305) can automatically detect malfunctioning or loss of functionality in one or more software applications that may be related to an installation of a software patch, without the involvement of a human analyst or human user. For example, the SPM server (e.g., a processor of the SPM server) can be programmatically configured to automatically receive information related to a schedule of distribution and deployment of a set of software patches in a set of compute devices. Based on the schedule of distribution and deployment of software patches, the SPM server can monitor the set of compute devices for messages or reports related to crashes, loss of functionality, and/or an unexpected termination of one or more installed software applications. The SPM server can use the information about the crash, loss of functionality, or unexpected termination of the one or more installed software applications to update dependencies between the installed software applications and the recently deployed software patches. For example, the SPM server can update dependencies associated with an installed software application reported to have crashed after the deployment of a particular software patch, by updating dependencies between the software application that crashed and the system components that may have been impacted by the software patch in the compute device reporting the crash. As another example, the SPM server can identify (using the dependency maps) the specific system components that are likely to interact with the software application reported to have crashed at the compute device and update dependencies between a particular deployed software patch and the specific system components to indicate that the particular software patch may impact the specific system components.

In some instances, the SPM server can receive information regarding a successful installation of a software patch in a first set of compute devices without loss of functionality and/or performance or with an acceptable rate of loss of functionality and/or performance (e.g., below a predetermined threshold criterion) for software applications. The information reporting successful installation of software patches can be used to increase accuracy of predictions made (e.g., accuracy of one or more prospective effect maps by a predictor such as predictor 358) regarding the expected outcomes of installation of the software patch in a second set of compute devices.

As described previously, the SPM server can receive crash reports from compute devices. In some instances, the crash reports can include identity of the software application that crashed, terminated unexpectedly, and/or lost some or all of its functionality. The crash report can also include information related to potential relationships between the events of loss in functionality of the software application and software patches that were recently deployed in that compute device before the crash events. For example, a crash report can include information related to changes in behavior of the software applications including changes in resource consumption (consumption of processor (CPU), memory, Input/Output, bandwidth, etc.), changes in interactions between the software application and certain system components that were not previously observed before the installation of a software patch, etc.

In some instances, analyses of crash reports and/or predictions of expected outcomes, made using a SPM server, regarding the installation of a set of software patches in a set of compute devices can be used to prioritize and/or schedule the deployment of the set of software patches. For example, an SPM server can receive a first set of reports (e.g., 100 reports) related to the deployment of a first software patch A Of the first set of reports a first number (e.g., 99 reports) or percentage (99%) of the reports may indicate that the first software patch A was successfully installed in a first subset of the designated compute devices, and a second number (e.g., 1 report) or percentage (e.g., 1%) of reports may indicate that the first software patch A was found to be related to an unacceptable loss of functionality and/or performance (e.g., a loss of functionality and/or performance above a threshold or meeting a criterion) or a crash of one or more software applications running at a second subset of the designated compute devices. The SPM server may additionally receive a second set of reports (e.g., 100 reports) related to the deployment of a second software patch B. Of the second set of reports a third number (e.g., 60 reports) or percentage (60%) of the reports may indicate that the second software patch B was successfully installed in a third subset of the designated compute devices, and a fourth number (e.g., 40 reports) or percentage (e.g., 40%) of reports may indicate that the second software patch B was found to be related to an unacceptable loss of functionality and/or performance (e.g., a loss of functionality and/or performance above a threshold or meeting a criterion) or a crash of one or more software applications running at a fourth subset of the designated compute devices. In some instances, the SPM server can use the sets of reports to determine a second priority associated with the first software patch A and a first priority associated with the second software patch B such that any issues associated with the second software patch B can be addressed prior to any issues associated with the first software patch A, as it is more likely that the issue with the first software patch A is a false positive than the issue with the second software patch B.

In some instances, the SPM server can use a prediction algorithm (e.g., via a predictor such as predictor 358) or provide results that can be used by a human analyst, to predict the impact of installation of the first software patch A and the second software patch B on a new set of compute devices. For example, based on a prediction of better success with the installation of the first software patch A on the new set of compute devices, the SPM server can prioritize the deployment of the first software patch A over the deployment of the second software patch B. In some instances, the SPM server can use results from analyses of crash reports and/or predictions to flag a software patch (e.g., software patch B) as a "potentially problematic" software patch that may require further analysis.

In some implementations, the SPM server can be configured to manage deployment of a software patch to a set of compute devices and monitor the messages from the set of compute devices for potential crash reports related to the deployed software patch. In some implementations, the SPM server can be configured to monitor the messages from the set of compute devices in which a software patch has been installed for a predetermined period of time following deployment of the software patch. For example, the SPM server can monitor the set of compute devices or messages from the set of compute devices for crash reports over a period of 24 hours, 48 hours, or 72 hours, or any suitable amount of time. For example, the SPM server can be configured to use a predetermined period of time for monitoring messages for crash reports following the deployment of a software patch based on one or more properties of the software patch (e.g., the system components impacted by the software patch, the number of software applications interacting with the system components impacted by the software patch, the sensitivity of data associated with the compute devices, the frequency of use of a set of software applications in the compute devices, etc.). The predetermined time period may be set by a user or automatically set by the SPM server.

Following the deployment of a software patch, and after the predetermined time period has passed, based on the number of crash reports received from the compute devices, the SPM server can flag the software patch to be a successfully deployable software patch. For example, the SPM server can compare the number of crash reports received against a preset threshold value. In some instances, when the number of crash reports is less than the preset threshold value the SPM server can flag or label the software patch as a successfully deployable software patch. In some instances, when the number of crash reports is greater than a preset threshold value the SPM server can label the software patch as potentially problematic software patch that may require further analysis.

In some instances, information received from user input can also be unrelated to installation of a software patch and may inform the SPM server of functioning software applications in the compute devices, usage of the compute devices, etc. In some instances, such as in the installation of several software patches, the information gathered from user input can be used to correlate effects of each of the software patches installed. In some instances, the SPM server can use information gathered from user input in addition to the data received from the compute devices (e.g., data collected and/or generated by agents and mappers) to schedule the distribution and deployment of a set of software patches in a set of compute devices. For example, the SPM server can generate instructions and schedules of deployment of a set of software patches that are customized for each compute device to meet the requirements of each individual compute device.

In some implementations, the SPM server described herein (e.g., server I 05 described with reference to FIG. 1, and/or server 305 described with reference to FIG. 3) can be configured to send a signal to deploy a software patch at a compute device (e.g., a test compute device) such that the SPM server can identify, based on one or more dependency maps, a set of system components on the compute device that are likely to be impacted by the software patch. The SPM server can then monitor a set of parameters for a set of applications on the compute device that interact with at least one system component from the set of system components identified to be likely impacted by the software patch. The parameters can include data associated with a software application, for example, feedback related to resource usage by the software application, as described in further detail below. The SPM server can be configured to compare values for the set of parameters to one or more predefined criteria to determine a compatibility classification for the software patch. In some instances, the compatibility classification can be used to update the one or more dependency maps to define one or more updated dependency maps. Based on the updated dependency maps the SPM server can send a signal to deploy the software patch at a set of compute devices.

In some implementations, an SPM server can be configured to monitor a compute device in which a software patch was deployed to determine a compatibility classification for a software patch. For example, a compatibility classification can include whether the software patch is successfully deployable (e.g., good software patch) or not successfully deployable (e.g., bad software patch) for each compute device, an extent to which the software patch affects applications on each compute device, and/or the like. For example, the SPM server can be configured to monitor and/or obtain data (e.g., data collected by an agent) associated with each application on the compute device that has a dependency on a recently installed software patch over a period of time. In some instances, the data associated with a software application can include feedback related to resource usage associated with the software application. For example, data associated with a software application can include feedback associated with processor usage associated with the application (e.g., CPU usage), storage or memory used by the application, rate of data transfer, also referred to as input/output use or IO (e.g., rate of reading and writing between a non-volatile storage device and a volatile memory) associated with the application, and a communication bandwidth usage, also referred to as BW, associated with the software application (e.g., bandwidth over a communication channel associated with the software application). In some instances, the SPM server can identify the compatibility classification for the software patch based on the data associated with the software application including feedback related to resource usage associated with the software application. In some instances, the SPM server can identify the compatibility classification for the software patch based on feedback associated with the software patch (e.g., feedback obtained from an agent executing on a compute device in which a software patch was recently deployed).

In some instances, the period of monitoring and/or data collection can include a first time period before and a second time period after the software patch was deployed. In some instances, the SPM server can use time-averaged data represented as a function of time over the first and/or second periods of time (e.g., a moving average of memory and/or processer usage over time).

The SPM server can compare the data obtained before the deployment of the software patch and the data obtained after the deployment of the software patch. In some implementations, the SPM server can be configured to detect any significant changes (e.g., changes greater than a preset threshold value) in the data between the first time period before the deployment of the software patch and the second time period after the deployment of the software patch. For example, the SPM server can be configured to detect and measure a significant increase in the usage of CPU, memory, IO and/or BW after the installation of a software patch compared to the usage of CPU, memory, IO and/or BW before the installation of the software patch. If the measured increase meets a criterion (e.g., is above a threshold value), the SPM server can label the software patch to be potentially problematic and associated with crashing and/or an unacceptable decrease in performance of the software application. For example, if a software application A is found to have consumed 3% CPU on average before the installation of a software patch and after the installation of a software patch the software application A is found to have increased consumption of CPU on average to 70%, the SPM server can detect this change in CPU usage greater than a threshold value (e.g., threshold change in CPU usage of 10%) and label and/or report this software patch as causing the software application A to crash.

In some instances, the SPM server (e.g., server 105 described with reference to FIG. 1, and/or server 305 described with reference to FIG. 3) can be configured to detect a consumption associated with a software application (e.g., usage of CPU, memory, IO and/or BW) that meets a criterion (e.g., is above a threshold value) after the installation of a software patch. In some instances, the SPM server can be configured to detect an absolute value of consumption associated with a software application (e.g., usage of CPU, memory, IO and/or BW) that meets a criterion (e.g., is above a threshold value) after the installation of a software patch, regardless of a degree of change between a time period before and after the installation of the software patch. For example, if before the installation of a software patch the CPU usage associated with a software application is 1% and after the installation of the software patch the CPU usage is 2% (i.e., indicating a 100% increase). In some instances, the SPM server can be configured to recognize that such a change in data associated with the software application can be negligible from the perspective of a user and not indicative of a crash or loss of functionality of the software application and thus not regard the change as the software patch being problematic. For example, in some implementations, the SPM server can be configured to detect a problem and/or the software application crashing based on installation of the software patch only when CPU usage associated with the software application increases above a threshold value. In some instances, the threshold value can be an absolute threshold (e.g., 60%). In some instances, the threshold value can be a comparative threshold (e.g., CPU usage associated with the software application after the installation of the software patch is more than 100% higher than the CPU usage associated with the software application before the installation of the software patch.) In some instances, the threshold value can include two or more values that indicate a combination of an absolute threshold and a comparative or relative threshold between the usage before and after the installation of a software patch. The SPM server can be configured to detect the software application as crashing only if all the threshold criteria are met. For example, the SPM server can be configured to detect the software application crashing based on installation of the software patch only when (i) CPU usage associated with the software application after the installation of the software patch is more than 100% higher than the CPU usage associated with the software application before the installation of the software patch, and (ii) the absolute value of CPU usage associated with the software application after the installation of the software patch is higher than 60%.

In some implementations, the devices and methods described above can be used to collect data and use the data to generate dependency maps that relate software patches and system components in compute devices that may be changed by the software patches. The data can further be used to generate dependency maps between system components within compute devices and the software applications installed in the compute devices that depend on or are affected by changes to the system components.

In some implementations, the devices and methods described above can be used to generate prospective effect maps that predict effects of installation of a software patch in a set of compute devices. The devices and methods described can identify, based on the predictions and prospective effect maps, a set of compute devices that can serve as candidate test compute devices. For example, the devices and methods described herein can receive, from a set of compute devices, data associated with (1) a set of software applications installed on each compute device and (2) interactions between the set of software applications installed on that compute device and a set of system components of that compute device. Based on the data, the devices and methods described herein can identify dependencies between the set of software applications installed on each compute device and the set of system components of each compute device. The devices and methods described herein can be used to define a set of dependency maps based on the dependencies, as described herein. Upon receiving information related to potential deployment of a software patch, the devices and methods described herein can be used to predict a group of system components likely to be altered by the software patch, and/or a set of software applications likely to be affected by the software patch. The devices and methods described herein can further be used to identify a subset of compute devices as test compute devices for the software patch and to send a signal to deploy the software patch at each of the test compute devices.

In some implementations, the devices and methods described herein can generate and distribute instructions and schedules for the deployment of a set of software patches in a set of compute devices. In some implementations, the instructions and schedules can be customized for each compute device.

In some implementations, the dependency maps can be used to generate prospective effect maps that identify an order in which software patches should be installed on a compute device. Specifically, based on the system components and/or the software applications installed on a compute device, it may be beneficial to update a first system component prior to updating a second system component. For example, based on the dependencies of the software applications, an order can be defined to install certain software patches prior to the installation of other software patches to reduce the likelihood of an adverse effect based on the installation of the software patches.

While the devices and methods described above relate to the analysis and management of distribution and deployment of software patches to a set of compute devices, the devices and methods described can be used towards any other suitable application that can benefit from collection of data, and/or the generation of dependency maps, prospective effect maps, and/or predictions based on the collected data. For example, in some implementations the devices and methods described herein can be used to collect data related to inbound and outbound data connections between compute devices that are implemented for various processes running within the compute devices. The collected data can be used to build dependency maps for connections and the effect of connections on system components. For example, the dependency maps can be used to predict which system components may be changed due to a specific set of connections. The dependency maps can be used to predict effects of certain events that may affect one or more processes and/or system components. For example, in the event of a malware threat or attack, the dependency maps can be used to predict which system components should be closed to minimize effects of the malware threat. The dependency maps can further be used to predict effects on software applications that may depend on one or more system components that may have been affected by malware, and the software applications themselves may be impacted or infected. In some instances, the dependency maps can be used to evaluate which other compute devices are connected to a potentially infected compute device, and this information can be used to minimize the spread of malware. In some instances, the dependency maps can be used trace the origin or source of the malware.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory processor-readable medium storing code representing instructions to be executed by a processor, the instructions comprising code to cause the processor to:
   receive information related to a first software patch that is configured for deployment on a subset of software applications installed on at a plurality of compute devices, the first software patch being untested and uninstalled in the plurality of compute devices;
   generate first dependency maps for each of the plurality of compute devices relative to the first software patch, the first dependency maps indicating one or more relationships between the first software patch and system components of each of the plurality of compute devices as well as known effects on the system components due to installation of the first software patch;
   build a prospective effects map based on the information and the first dependency maps;
   predict, based on the prospective effects map, a group of the system components and of the software applications likely incompatible with deployment of the first software patch;
   calculate a risk of deployment of the first software patch on each of the plurality of compute devices;
   based on the risk, select test compute devices of the plurality of compute devices for safe software patch deployment;
   send a first signal to deploy the first software patch at the test compute devices;
   receive additional information from the test compute devices related to deployment of the first software patch;
   based on the additional information, build additional dependency maps between the first software patch and one or more system components altered by the first software patch at the test compute devices;
   build additional prospective effects maps based on the additional dependency maps to predict effects to be encountered when the first software patch is deployed in untested compute devices of the plurality of compute devices;
   preemptively resolve an issue that arises from deployment of the first software patch at the untested compute devices, wherein the issue includes one of the predicted effects; and
   send a second signal to deploy the first software patch at the untested compute devices.

2. The non-transitory processor-readable medium of claim 1, wherein the system component includes one or more or a combination of:
   a dynamic link library (DLL),
   an executable system component file, and
   a registry key.

3. The non-transitory processor-readable medium of claim 1, wherein the additional prospective effects maps are configured to:
   predict effects encountered on one or both of the system components and the software applications in specific compute devices of the untested compute devices; or
   predict effects encountered on specific types of the untested compute devices upon deployment of the first software patch.

4. The non-transitory processor-readable medium of claim 1, wherein the additional prospective effects maps are configured to indicate that although there is an unknown relationship between the first software patch and a system component, the system component is predicted to be effected or changes because the first software patch is installed.

5. The non-transitory processor-readable medium of claim 1, wherein the instructions comprise code to cause the processor to monitor the untested compute devices for messages related to crashes, loss of functionality, or an unexpected termination of one or more installed software applications of the untested compute devices following deployment of the first software patch.

6. The non-transitory processor-readable medium of claim 1, wherein the instructions comprise code to cause the processor to:
   monitor the untested compute devices for messages that report successful installation of the first software patch; and
   based on the messages, increase accuracy of the predicted effects made in the additional prospective effects maps.

7. The non-transitory processor-readable medium of claim 1, wherein the instructions further comprise code to cause the processor to:
   receive, from the untested compute devices, feedback associated with at least one of processor use, memory use, input/output use, or bandwidth use after deployment of the first software patch; and
   identify a compatibility classification for the first software patch based on the feedback.

8. The non-transitory processor-readable medium of claim 1, wherein the additional information is received from agents executing on the test compute devices.

9. A method of safe software patch deployment, the method comprising:
   receiving information related to a first software patch that is configured for deployment on a subset of software applications installed on at a plurality of compute devices, the first software patch being untested and uninstalled in the plurality of compute devices;
   generating first dependency maps for each of the plurality of compute devices relative to the first software patch, the first dependency maps indicating one or more relationships between the first software patch and system components of each of the plurality of compute devices as well as known effects on the system components due to installation of the first software patch;

building a prospective effects map based on the information and the first dependency maps;

predicting, based on the prospective effects map, a group of the system components and of the software applications likely incompatible with deployment of the first software patch;

calculating a risk of deployment of the first software patch on each of the plurality of compute devices;

based on the risk, selecting test compute devices of the plurality of compute devices for safe software patch deployment;

sending a first signal to deploy the first software patch at the test compute devices;

receiving additional information from the test compute devices related to deployment of the first software patch;

based on the additional information, building additional dependency maps between the first software patch and one or more system components altered by the first software patch at the test compute devices;

building additional prospective effects maps based on the additional dependency maps to predict effects to be encountered when the first software patch is deployed in untested compute devices of the plurality of compute devices;

preemptively resolving an issue that arises from deployment of the first software patch at the untested compute devices, wherein the issue includes one of the predicted effects; and sending a second signal to deploy the first software patch at the untested compute devices.

10. The method of claim 9, wherein the system component includes one or more or a combination of:
a dynamic link library (DLL),
an executable system component file, and
a registry key.

11. The method of claim 9, wherein the additional prospective effects maps are configured to:
predict effects encountered on one or both of the system components and the software applications in specific compute devices of the untested compute devices; or
predict effects encountered on specific types of the untested compute devices upon deployment of the first software patch.

12. The method of claim 9, wherein the additional prospective effects maps are configured to indicate that although there is an unknown relationship between the first software patch and a system component, the system component is predicted to be effected or changes because the first software patch is installed.

13. The method of claim 9, further comprising monitoring the untested compute devices for messages related to crashes, loss of functionality, or an unexpected termination of one or more installed software applications of the untested compute devices following deployment of the first software patch.

14. The method of claim 9, further comprising:
monitoring the untested compute devices for messages that report successful installation of the first software patch; and
based on the messages, increasing accuracy of the predicted effects made in the additional prospective effects maps.

15. The method of claim 9, further comprising:
receiving, from the untested compute devices, feedback associated with at least one of processor use, memory use, input/output use, or bandwidth use after deployment of the first software patch; and
identifying a compatibility classification for the first software patch based on the feedback.

16. The method of claim 9, wherein the additional information is received from agents executing on the test compute devices.

* * * * *